US010744679B2

(12) United States Patent
Bank et al.

(10) Patent No.: US 10,744,679 B2
(45) Date of Patent: Aug. 18, 2020

(54) PROCESS FOR RECLAIMING SCRAP OR UNUSED EPOXY RESIN PREPREG

(71) Applicant: Dow Global Technologies LLC, Midland, MI (US)

(72) Inventors: David H. Bank, Midland, MI (US); Amit K. Chaudhary, Midland, MI (US); Xiaofei Sun, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 32 days.

(21) Appl. No.: 15/762,876

(22) PCT Filed: Jun. 7, 2017

(86) PCT No.: PCT/US2017/036279
§ 371 (c)(1),
(2) Date: Mar. 23, 2018

(87) PCT Pub. No.: WO2017/222815
PCT Pub. Date: Dec. 28, 2017

(65) Prior Publication Data
US 2019/0099920 A1 Apr. 4, 2019

Related U.S. Application Data

(60) Provisional application No. 62/352,104, filed on Jun. 20, 2016.

(51) Int. Cl.
| | | |
|---|---|---|
| *B29B 17/00* | (2006.01) | |
| *B29B 17/04* | (2006.01) | |
| *C08J 11/06* | (2006.01) | |
| *C08G 59/40* | (2006.01) | |
| *C08G 59/68* | (2006.01) | |
| *C08J 5/04* | (2006.01) | |
| *B29K 63/00* | (2006.01) | |
| *B29K 101/10* | (2006.01) | |
| *B29K 105/24* | (2006.01) | |
| *B29K 105/06* | (2006.01) | |
| *B29C 43/34* | (2006.01) | |
| *B29K 105/16* | (2006.01) | |

(52) U.S. Cl.
CPC ...... *B29B 17/0042* (2013.01); *B29B 17/0026* (2013.01); *B29B 17/0412* (2013.01); *C08G 59/4021* (2013.01); *C08G 59/686* (2013.01); *C08J 5/042* (2013.01); *C08J 11/06* (2013.01); *B29C 2043/3455* (2013.01); *B29K 2063/00* (2013.01); *B29K 2101/10* (2013.01); *B29K 2105/06* (2013.01); *B29K 2105/16* (2013.01); *B29K 2105/246* (2013.01); *Y02W 30/62* (2015.05)

(58) Field of Classification Search
None
See application file for complete search history.

(56) References Cited

U.S. PATENT DOCUMENTS

| | | | |
|---|---|---|---|
| 5,075,057 A | 12/1991 | Hoedl | |
| 5,647,544 A * | 7/1997 | Greiner | ..................... B03B 1/00 241/17 |
| 8,900,493 B2 | 12/2014 | Meier | |
| 9,856,358 B2 * | 1/2018 | Witte | ..................... B29C 48/92 |
| 2011/0036481 A1 * | 2/2011 | Inserra Imparato | ........................ B29B 17/0042 156/94 |
| 2011/0212317 A1 * | 9/2011 | Katz | ................... B29B 17/0042 428/297.4 |
| 2015/0151454 A1 | 6/2015 | Herrmann et al. | |
| 2016/0214278 A1 * | 7/2016 | Dauner | ............... B29B 17/0042 |
| 2018/0029249 A1 * | 2/2018 | Desbois | .................. B29C 43/24 |
| 2018/0229393 A1 * | 8/2018 | Corden | ............... B29B 17/0026 |
| 2018/0326678 A1 * | 11/2018 | Villalon | ............... B29B 17/0026 |

FOREIGN PATENT DOCUMENTS

| | | |
|---|---|---|
| DE | 3744728 | 12/1988 |
| DE | 3717277 | 3/1989 |
| DE | 19743545 | 4/1998 |
| EP | 2282879 B1 | 9/2013 |
| JP | 2000254919 A | 9/2000 |
| JP | 2001354256 A | 12/2001 |
| JP | 2002144340 A | 5/2002 |
| JP | 2002302914 A | 10/2002 |
| JP | 2005305876 A | 11/2005 |
| JP | 2005307121 A | 11/2005 |
| WO | 1989009123 | 10/1989 |
| WO | 2013168302 | 11/2013 |

OTHER PUBLICATIONS

HexFlow RTM6 Product Data Sheet, HEXCEL (Year: 2018).*
HexPly M21 Product Data Sheet, HEXCEL (Year: 2016).*
Cunliffe, A. M., N. Jones, and P. T. Williams, Recycling of Fibre-Reinforced Polymeric Waste by Pyrolysis: Thermo-Gravimetric and Bench-Scale Investigations, Journal of Analytical and Applied Pyrolysis, 70 (2003), 315-38.
Torres, A., I. De Marco, B. M., et. al., Recycling by Pyrolysis of Thermoset Composites: Characteristics of the Liquid and Gaseous Fuels Obtained, Fuel, 79 (2000), 897-902.

(Continued)

*Primary Examiner* — Mary Lynn F Theisen

(57) ABSTRACT

Method for recycling scrap that contains one or more heat resistant fibers and from 25 to 60 wt. %, based on the total weight of the scrap, of an at least partially uncured to fully uncured two component thermosetting resin mixture of (i) one or more thermosetting resins, and (ii) a solid hardener, the methods comprising shredding the scrap to an average size of from 3 to 50 mm, mixing the shredded scrap, preferably after preheating the scrap, to provide a fluid material charge and then compression molding the fluid material charge to make a cured composite material.

9 Claims, No Drawings

(56) References Cited

OTHER PUBLICATIONS

Bai, Yongping, Zhi Wang, and Ligun Feng, Chemical Recycling of Carbon Fibers Reinforced Epoxy Resin Composties in Oxygen in Supercritical Water, Materials & Design, 31 (2010) 999-1002.
Chemical Recycling of Plastics Using Sub- and Supercritical Fluids, Journal of Supercritical Fluids, 47 (2009), 500-07.
Pinero-Hernanz, Raul, Christopher Dodds, et. al., Chemical Recycling of Carbon Fibre Reinforced Composites in Nearcitical and Supercritical Water, Composites Part A: Applied Science and Manufacturing, 39 (2008), 454-61.

* cited by examiner

PROCESS FOR RECLAIMING SCRAP OR UNUSED EPOXY RESIN PREPREG

The present invention relates to methods for reclaiming scrap containing a two component thermosetting resin mixture, for example, of (i) one or more epoxy resins and (ii) a latent catalyst and/or hardener, such as a solid hardener or catalyst, and heat resistant fiber, such as prepregs of carbon fiber, glass fiber, or their admixture, the methods comprising shredding the scrap, and mixing, for example, batch mixing, the shredded scrap to provide a fluid material charge and then compression molding the fluid material charge to make a cured composite material.

In using resin pre-impregnated fiber materials or prepregs for moldings, there is significant yield loss (up to 30%) of the prepreg, resulting into high production costs of such materials. Reclaiming this yield loss reclaims value from the overall cost of the material. Of the several known industrial methods, thermal decomposition decomposes the resin and reclaims the fiber, which can be converted into a prepreg with the reclaimed fibers; and chemical decomposition either reverses the curing of thermoset resins or dissolves the resin using an organic solvent, allowing one to reclaim the fiber. Further, known mechanical reclaiming of prepreg scraps comprises thermally curing the prepreg scraps, followed by shredding or grinding the cured material for use as a filler in making composites or other applications, e.g. concrete. Such approaches either fail to use all of the scrap material or only use it to in place of an inorganic filler and not in an application of equal value or higher value (upcycling).

United States patent publication no. US 20150151454 A1, to Airbus Operations GmbH, has disclosed a recycling method for uncured scraps, such as prepregs, comprising introducing the scraps directly into an extruder, mixing and feeding into a shaping mechanism, like a mold. The Airbus patent fails to resolve the uncontrolled shear of the fibers of a given scrap material when it is fed into an extruder, thereby lowering the bulk density of the mixed material to a level that results in poor molding quality.

The present inventors have sought to solve the problem of effectively reclaiming both the fiber and the resin mixture from scrap materials containing heat resistant fibers and thermosetting resin compositions, such as resin pre-impregnated materials or prepregs, sheet molding compounds (SMC), or bulk molding compounds, without the use of thermal or chemical decomposition or separation.

STATEMENT OF THE INVENTION

1. The present invention provides methods for reclaiming scrap containing from 25 to 60 wt. %, or, preferably, from 30 to 45 wt. %, based on the total weight of the scrap, of an at least partially uncured to fully uncured, for example, from 10 to 65 wt. % cured or less than 30 wt. % cured two component thermosetting resin mixture of (i) one or more thermosetting resins, such as epoxy resin, vinyl ester resin, or polyester, or, preferably, liquid epoxy resins, and (ii) a latent catalyst and/or hardener, such as a solid hardener or catalyst, and one or more heat resistant fibers, the methods comprising shredding the scrap, then mixing, for example, batch mixing, or, preferably, preheating the scrap to from 40 to 100° C. and then mixing, for example, batch mixing, the shredded scrap to provide a fluid material charge and then compression molding the fluid material charge to make a cured composite material.

2. In accordance with the present invention, methods to reclaim unused scrap materials or scrap containing one or more heat resistant fibers, for example, carbon fiber and/or glass fiber, impregnated or infused with one or more at least partially uncured to fully uncured two component thermosetting resin mixture such as at least partly uncured, for example, from 10 to 65 wt. % cured or less than 30 wt. % cured (i) thermosetting resins, for example, epoxy resin, vinyl ester resin, or polyester, and (ii) one or more curing agent or catalyst, comprise shredding the scrap material into pieces having an average size of from 3 to 50 mm or, preferably, 37 mm or less or 7 mm or more, or, preferably, 26 mm or less; mixing the shredded scrap material to form a fluid material charge by (a) extruding the shredded scrap material at a temperature A which is at least 10° C. or, preferably, at least 20° C. above a Temperature B, which is the glass transition temperature (Tg, Dynamic DSC) of the (i) thermosetting resin in the at least partially uncured to fully uncured two component thermosetting resin mixture that has the highest Tg of the thermosetting resins in the scrap, or by (b) preheating the shredded scrap material to at least 5° C. above Temperature B and batch mixing the shredded material at at least the Temperature B; followed by compression molding the fluid material charge to make a cured composite, wherein in (a) or (b) if needed, the mixing includes combining the shredded scrap material with a sufficient amount of one or more at least partially uncured to fully uncured two component thermosetting resin mixture which has a (i) thermosetting resin Tg (Dynamic DSC) of below Temperature B to provide a fluid material charge having a total of from 25 to 60 wt. % or, preferably, from 30 to 45 wt. %, based on the total weight of the scrap, of an at least partially uncured to fully uncured two component thermosetting resin mixture.

3. In accordance with the methods of the present invention in 1 or 2, above, wherein the mixing includes combining the shredded scrap material with any of (i) a thermosetting resin having a Tg (Dynamic DSC) above 30° C., a liquid thermosetting resin, or mixtures thereof; (ii) virgin chopped fiber, for example, glass fiber and/or carbon fiber; one or more additives, such as catalysts, hardeners, tougheners or mold release agents, preferably, mold release agents; (iii) molding materials, such as random or bulk molding compounds, comprising virgin chopped fibers and thermosetting resins, wherein in (ii) or (iii), wherein the resulting shredded scrap material contains from 25 to 60 wt. % of total uncured thermosetting resin, based on the total weight of the resulting shredded scrap material.

4. In accordance with the methods of the present invention in any of 1, 2, or 3, above, further comprising shaping the fluid charge into a desired shape, such as, for example, sheets, by using nip rolls or a laminator, or three dimensional (3D) profiles, by casting into different molds, prior to compression molding.

5. In accordance with the methods of the present invention in any of 1, 2, 3, or 4, above, wherein the (i) thermosetting resin comprises one or more epoxy resins, such as bisphenol A or F diglycidyl ether epoxy resins, preferably, liquid epoxy resins having a Tg (Dynamic DSC) of from, −10 to 30° C., and a latent hardener and/or catalyst, such as a solid hardener and/or catalyst.

6. In accordance with the methods of the present invention as in any of 1, 2, 3, 4, or 5, above, wherein the at least partially uncured to fully uncured two component thermosetting resin mixture comprises (i) one or more epoxy resins that has a viscosity (Rheometer, Oscillatory shear rate sweep from 0.1-100 rad/sec at 25% strain in a 25 mm parallel plate geometry) of from 500 to 30,000 mPa·s at the mixing temperature temperature or, preferably, from 1000 to 10,000 mPa·s at the mixing temperature, preferably, a liquid epoxy resin.

7. In accordance with the methods of the present invention as in any of items 1, 2, 3, 4, 5, or 6, above, wherein the one or more heat resistant fibers is chosen from carbon fiber, glass fiber, ceramic fiber, acrylonitrile fibers, aramid fibers, or their admixtures.

8. In accordance with the methods of the present invention as in any of items 1, 2, 3, 4, 5, 6, or 7, above, wherein the one or more latent hardener and/or catalyst is a solid catalyst that is chosen from a urea containing catalyst, a urea resin containing catalyst, a dicyandiamide, cyanoguanidine, and an oxazolidine group containing catalyst.

9. In accordance with the methods of the present invention as in any of items 1, 2, 3, 4, 5, 6, 7, or 8, above, wherein the scrap further comprises one or more impact modifiers, internal mold release agents, reactive diluents, coalescents, pigments, particulate fillers, extenders, tackifiers, antioxidants or wetting agents, preferably, internal mold release agents.

10. In accordance with the methods of the present invention as in any previous item 1 to 9, wherein the cured composite material contains randomly oriented heat resistant fibers.

11. In accordance with the methods of the present invention as in any previous item 1 to 10, wherein the scrap does not comprise a backing layer.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(poly)alkoxy" refers to alkoxy, polyalkoxy, or mixtures thereof.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, unless otherwise indicated, the term "amine hydrogen equivalent weight" or AHEW means the amount in grams of an amine that yields one molar equivalent of hydrogen in reaction as measured by titration using ASTM D 2074-07 (2007).

As used herein, the term "ASTM" refers to the publications of ASTM International, West Conshohocken, Pa.

As used herein, the term "at least partly uncured" two component thermosetting resin mixture refers to a two component thermosetting resin that flows below 100° C. and at a temperature above the glass transition temperature or Tg (Dynamic DSC) of at least one of the one or more thermosetting resins in the two component resin mixture. In calculating the portion of any two component thermosetting resin mixture that is cured or uncured, the increase in flow temperature is assumed to be directly proportional to the degree of cure in a given two component resin mixture. It is assumed that 100% of any two component resin mixture is completely cured at 150° C. For example, if a given two component thermosetting resin mixture comprises just one epoxy resin having a Tg of 20° C. and flows at 100° C., then $(1-(100-20)/(150-20)) \times 100\%$ or $(1-(80/130) \times 100\%$ or roughly 38.5 wt. % of two component resin mixture is uncured. Thus, 61.5 wt. % of the given two component resin mixture is cured.

As used herein, unless otherwise indicated, the term "average size" means the size of a given material obtained by measuring the length (X direction or fiber direction) and width (Y direction) of the material with a scale or ruler. A "fiber length" is an actual length of fiber in a shredded material by first burning the shredded material at 600° C., followed by suspending the recovered fibers in a solvent and then laying up on a microscope slide and measuring the length.

As used herein, the term "composite" means a cured material containing a matrix of one or more thermosetting resins and dispersed in the matrix one or more heat resistant fiber compositions.

As used herein, the term "EEW" or "epoxy equivalent weight" means the amount determined using a Metrohm 801 Robotic USB sample processor XL and two 800 Dosino™ dosing devices for the reagents (Metrohm USA, Tampa, Fla.). The reagents used are perchloric acid in acetic acid 0.10 N and tetraethylammonium bromide. The electrode for the analysis is an 854 Iconnect™ electrode (Metrohm). For each sample, 1 g of dispersion is weighed out into a plastic sample cup. Then 30 mL of THF (tetrahydrofuran) is first added and mixed for 1 minute (min) to break the shell on the dispersion. Next, 32 mL of glacial acetic acid is added and mixed for another 1 min to fully dissolve the sample. The sample is then placed on the auto sampler and all relevant data (e.g., sample ID, sample weight) is added to the software. From here the start button is clicked to start the titration. Thereafter, 15 mL of tetraethylammonium bromide is added, and then the perchloric acid is slowly added until a potentiometric endpoint is reached. Once the potentiometric endpoint is reached, the software calculates an EEW value based on the amount of sample and perchloric acid used.

As used herein, the term "glass transition temperature" or "Tg" refers to the temperature determined, for a given material, by dynamic differential scanning calorimetry (Dynamic DSC) wherein each indicated material was heated from −25 to 200° C. on a heating ramp of 10° C./min, then kept isothermal at 200° C. for three minutes (first ramp), then cooled on a ramp of 25° C./min down to 25° C. and was kept isothermal at 25° C. for three minutes, and was then heated to 200° C. a second time while DSC was performed using a heating ramp of 10° C./min (second ramp). Tg onset and Tg midpoint were determined, respectively, as the onset of the plateau on the resulting DSC curve and the inflection point on the resulting DSC curve. An "Initial Glass Transition Temperature" or "Initial Tg" refers to the Tg of an uncured material obtained from the first ramp as mentioned, above. Initial Tg is that reported as the Tg of indicated resins and formulations prior to cure.

As used herein, the term "solid" refers to the state of a given material below its glass transition temperature.

Unless otherwise indicated, a given material has a given state under ambient conditions and under batch mixing, preheating and shredding conditions; for example, a solid catalyst remains a solid under batch mixing, preheating and shredding conditions.

As used herein, unless otherwise indicated, the term "solids content" refers to the total weight of epoxy resins, hardeners, catalysts or accelerators, and other non-volatile materials, such as pigments, silicones and non-volatile additives that remain after cure, expressed as a total wt. % of the composition, regardless of their state as liquids, gases or solids. Solids exclude solvents, such as xylene, and non-reactive diluents, such as, for example, plasticizers like butyl adipates.

As used herein, the term "thermosetting" means a resin containing material that cures or crosslinks upon exposure to heat; and the term "thermoset" refers to a heat cured or crosslinked resin containing material.

As used herein, the abbreviation "wt. %" stands for weight percent.

The present inventors have discovered methods that allow one to reformulate scrap material containing at least partly uncured thermosetting resin and heat resistant fibers, for example, prepreg materials, bulk molding compounds and/or sheet molding compounds (SMC) comprising shredding the scrap, preheating the thermosetting resin and mixing using a batch mixer or extruder to produce molding compound that can be converted into any desired shape. There is no definite prerequisite of starting shape and size of downsized scraps. The shredding is conducted at room temperature, with no need for cooling before or during. Batch mixing to ensure better formulation accuracy and consistency, which is challenging to achieve using a continuous process like sheet molding compounds (SMC) because of difficulties in handling and feeding the tacky scrap material. Thus, batch mixing ensures better product quality consistency. Further, the methods of the present invention allow for higher production efficiency compared with labor-intensive sorting and re-stitching.

In accordance with the methods of the present invention, the scraps are shredded to pieces having an average size of 3 to 50 mm. If the average size is too low, the bulk density of the shredded scrap remains too low to provide moldings with acceptable mechanical properties. If the average size if too high, the fluid material charge lacks sufficient fluidity to give uniform moldings.

In accordance with the methods of the present invention, the mixing of shredded scrap enables formation of a fluid material charge for molding. Batch mixing can ensure proper fluidity needed to fill a mold without gaps or air pockets. Suitable mixers comprise a batch mixer, for example, a Sigma mixer, Henschel mixer, Planetary mixer, Haake mixer, or a continuous mixer, such as an extruder, Teledyne mixer, or Farrel Continuous Mixer.

The composites of the present invention may be formed by introducing the fluid material charge into a compression mold and curing.

In compression molding in accordance with the present invention, fluid material charge is introduced into a mold, which may be preheated. The curing temperature may be, for example, from 60 to 180° C., for example, from 80 to 170° C., or, preferably 100 to 160° C., or especially preferably, 120 to 150° C.

Suitable compression molding pressures range from 6,000 to 30,000 kPa (60 to 300 bar) or, preferably, from 10,000 kPa to 20,000 kPa.

Preferably, curing is continued for from 30 to 300 seconds or less, or, preferably, 240 seconds or less, or, more preferably, 180 seconds or less, or, even more preferably, 120 seconds or less or 60 seconds or less.

The methods of the present invention are amenable to various forms of compression molding, including flat plaques, or any other three dimensional molded form. The final molding compound can also be co-molded with one or more prepregs.

In the compression molding methods of the present invention, the fluid material charge comprises a sufficient amount of the liquid or semi-solid thermosetting resin to enable the material charge to flow into the mold. If needed, the fluid material charge can comprise virgin thermosetting resin or another fluid material, such as a reactive diluent or mold release agent.

In a suitable compression molding method, the mold may contain, in addition to the fluid material charge, one or more added fiber materials, such as chopped fibers.

The mold and the fluid material charge may be heated to the curing temperature or some other useful elevated temperatures prior to contacting them any virgin thermosetting resin. The mold surface may be treated with an external mold release agent, which may contain solvent or water.

The fluid material charge compositions may be enclosed in a bag or film such as is commonly used in vacuum assisted compressing molding processes.

The particular equipment that is used to transfer the fluid material charge to the mold is not considered critical to the invention, provided the fluid material charge can be transferred to the mold before it attains a high viscosity or develops significant amounts of gels.

Preferably, methods wherein the fluid material charge compositions are deposited into an open mold comprise gap compression resin transfer molding, in which the mold containing the fibers is kept open with a gap which may be, for example, 3 to 100% or more of the original mold cavity thickness. The gap permits lower flow resistance, which makes mold filling easier and facilitates penetration of the reaction mixture around and between the fibers.

The at least partly uncured two component scrap materials of the present invention have a sufficient density to provide for moldings having good mechanical properties. Materials with too low a bulk density will provide inferior handling and mixing of the scrap material with the two component resin blend and hence molded products.

Suitable scrap materials include may include prepregs, sheet molding compounds (SMC), or bulk molding compounds. In most of the scrap materials, most of any liner or release layer has been removed. However, the scrap materials of the present invention may include remnants of liners or release layers, which get shredded and mixed with the rest of the scrap material.

Preferably, the at least partly uncured two component scrap materials of the present invention have a density of 0.1 g/cm$^3$ or higher, such as up to 2 g/cm$^3$, or 0.3 to 1.4 g/cm$^3$.

To ease molding of the at least partly uncured materials of the present invention, the materials are preheated; this is especially important if the materials are dry have or a low bulk density (less than 0.25 g/cc), such as for fluffy materials that may pose processing problems unless they are preheated.

Suitable thermosetting resins for scrap materials or the fluid material charge useful in the present invention include any epoxy resin or its blends that is liquid at room temperature or, preferably, has a viscosity of 10,000 mPa·s or, more preferably, <6,000 mPa·s (Rheometer, oscillatory shear rate sweep from 0.1-100 rad/sec at 25% strain in a 25 mm parallel plate geometry) at mixing or processing temperature. The scraps may include curatives, mold release agents, tougheners, etc.

In the scrap materials or fluid material charge useful in the methods of the present invention, the (i) epoxy resins can be any compound which contains, on average, more than one epoxy moiety per molecule, or a mixture of such epoxy resin compounds, and which have the desired viscosity or are liquid at mixing or processing temperatures. Epoxy resins may include partially advanced epoxy resins, i.e. the reaction of a polyepoxide and a suitable aromatic or alicyclic polyol, wherein the reaction product has an average of more than one unreacted epoxide unit per molecule. Suitable polyepoxides (polyglycidyl ethers of a polyol) may be prepared by reacting an epihalohydrin with an aromatic or alicyclic polyol or a halogenated aromatic or alicyclic polyol. The preparation of such compounds is well known in the art. See Kirk-Othmer Encyclopedia of Chemical Technology 3rd Ed. Vol. 9 pp 267-289 (incorporated herein by reference).

Preferred polyols for making epoxy resins are the bisphenols; and polyalkylene glycols.

The epoxy resins of the scrap materials or the fluid material charge of the present invention may comprise conventional epoxy resins which have the desired viscosity or are liquid at mixing or processing temperatures, such as bisphenol A or F epoxy resins, phenolic epoxy resins, polyphenolic epoxy resins, novolac epoxy resins and cresol epoxy resins, as well as mixtures thereof.

Suitable epoxy resins for blending with the scrap materials or the fluid material charge of the present invention may include any conventional epoxy resins that are liquid or solid at room temperature and have an EEW below 500, such as Type-1 epoxy, or, preferably, below 250, such as bisphenol A or F epoxy resins, phenolic epoxy resins, polyphenolic epoxy resins, novolac epoxy resins and cresol epoxy resins, as well as mixtures thereof, for example, mixtures of bisphenol epoxy resins and novolac epoxy resins.

Preferably, the epoxy resins used in the present invention are linear or difunctional glycidyl ethers of polyols, chosen from epoxy resins having an epoxy equivalent weight (EEW) of from 150 to 1000 or, preferably, below 250.

The stoichiometric ratio of epoxy resin to the amine groups or hardener (e.g. carboxylic group) equivalents in the scrap materials or fluid material charge of the present invention may range from 0.7:1 to 1.4:1, or, preferably, from 0.85:1 to 1.3:1, or, most preferably, 0.90:1 to 1:0.90.

Composites made in accordance with the invention may have fiber contents of at least 40 wt. %, and up to 70 wt. %. Within the acceptable ranges given for a fluid material charge, scrap materials having lower proportions of fiber can be used where the thermosetting resins have lower viscosities.

Suitable heat resistant fibers found in useful scrap materials and fluid material charges are those fibers that are thermally stable and have a melting temperature such that the reinforcing fibers do not degrade or melt during the curing process. Suitable fiber materials include, for example, glass, quartz, polyaramid, boron, carbon, wheat straw, hemp, sisal, cotton, bamboo and gel-spun polyethylene fibers.

The scrap material or fluid material charge compositions of the present invention may also contain other components aside from scrap, such as, for example, impact modifiers or tougheners, internal mold release agents (IMR), pigments, antioxidants, preservatives, reinforcing fibers short (up to 15.24 cm (6 inches) in length or, preferably, up to 5.08 cm (2 inches) in length, more preferably up to 1.27 cm 9 (½ inch) in length, non-fibrous particulate fillers including nanoparticles, wetting agents, and internal mold release agents the like. An electroconductive filler may be present.

Suitable impact modifiers include natural or synthetic polymers having a DSC Tg of lower than −40° C., preferably present in the form of small particles. These include natural rubber, styrene-butadiene rubbers, polybutadiene rubbers, isoprene rubbers, polyethers such as poly(propylene oxide), poly(tetrahydrofuran) and butylene oxide-ethylene oxide block copolymers, core-shell rubbers, and mixtures of any two or more of the foregoing. The particles can be dispersed within the epoxy resin or hardener and preheated together with the epoxy resin or (ii) mixture of triethylenetetraamine and 2-phenylimidazole prior to forming the hot reaction mixture.

The fluid material charge or the two component scrap material of the present invention comprise an internal mold release agent. Such an internal mold release agent may constitute up to 5 wt. %, or, preferably, up to 1 wt. % of the total fluid material charge. Suitable internal mold release agents are well known and commercially available, including those marketed as Marbalease™ additives by Rexco-USA, Mold-Wiz™ additives by Axel Plastics Research Laboratories, Inc., Chemlease™ additives by Chem-Trend, PAT™ by Wurtz GmbH, or Waterworks Aerospace Release by Zyvax and Kantstik™ additives by Specialty Products Co. In addition to (or instead of) adding the internal mold release agent during mixing, it is also possible to combine such an internal mold release agent into the epoxy component and/or the hardener component before the epoxy component and the hardener component are brought together.

Suitable particulate fillers or extenders have an aspect ratio of less than 5, preferably less than 2, and do not melt or thermally degrade under the conditions of the curing reaction. Suitable fillers include, for example, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive, and their presence in the composite can increase the electroconductivity of the resulting cured composite material. Suitable conductive fillers include metal particles (such as aluminum and copper), carbon black, carbon nanotubes, graphite and the like.

Short fibers can be introduced into a compression mold as a part of the fluid material charge. Such short fibers may be, for example, blended with a thermosetting resin or hardener component (or both) during batch mixing or extrusion. Alternatively, the short fibers may be added into the fluid material charge prior to introducing the fluid material charge into the mold. Further, alternatively, short fibers can be sprayed into a mold. In such cases, the fluid material charge can be flowed into the mold, at the same time or after the short fibers are sprayed in. The sprayed materials may be spread and/or leveled using a doctor blade or similar device before curing. For example, long fibers are chopped into short lengths and the chopped fibers are sprayed into the mold, when or immediately before a fluid material charge mixture is introduced.

The methods of the present invention can be used to make a wide variety of composite products where fiber reinforced plastics appear, including various types of automotive or other transportation parts, housings for appliances and electronics goods, sporting goods.

EXAMPLES

The following examples are used to illustrate the present invention without limiting it to those examples. Unless otherwise indicated, all temperatures are ambient temperatures and all pressures are 101 kPa (1 atmosphere).

The following materials and chemicals were used in the Examples that follow:

Epoxy Resin 1: A liquid epoxy resin of a digycidyl ether of bisphenol A, having an epoxy equivalent weight (EEW) of 184 to 191 g/eq;

Epoxy Resin 2: A liquid epoxy novolac resin 1, EEW 175-181 g/eq;

Epoxy Resin 3: A liquid epoxy resin of a diglycidyl ether of bisphenol A, EEW 176-182 [DER 383];

Epoxy Resin 4: A solid epoxy resin of a digycidyl ether of bisphenol A, EEW of 395 to 405 g/eq., Tg (DSC) 45° C.;

Hardener: Dicyandiamide (Technicure NanoDicy™, Air Products & Chemicals, Inc., Allentown, Pa.) AHEW of 21 g/eq.;

Hardener 2: DETDA (Diethyltoluenediamine) with $Cu(BF_4)_2$, DEH 650 (Olin Corporation, Clayton, Mo.);

Catalyst 1: Urea group containing catalyst, TBDMU (Toluenebis dimethyl urea) (Omicure™ U-410M, CVC Thermoset Specialties, Moorestown, N.J.);

Catalyst 2: Imidazole group containing catalyst (Curezol™ 2MZ-A, Shikoku Chemicals Corp., Tokyo, JP);

Catalyst 3: HYCAT™ 3100s Trivalent chromium (III) carboxylate complex containing <10 wt. % phenol and <10 wt. % benzyldimethylamine (1.79 wt. %), 1 methyl imidazole (1.79 wt. %) (Dimension Technology Chemical Systems, Inc., Fair Oaks, Calif.);

Mold Release Agent 1: Licowax™-S montan fatty acid wax (Clariant, Pratteln, CH);

Mold Release Agent 2: Licolub™ WE4 montan fatty acid ester wax (Clariant);

Carbon fiber (12K fibers in a tow, A42-D012, DowAksa, Turkey);

UD: Unidirectional fiber prepreg of carbon fiber;

NCF: Non Crimp Fabric of carbon fiber (590 $g/m^2$); and,

Braid: Braided fabric of carbon fiber (733 $g/m^2$).

Test Methods:

Glass Transition Temperature (Tg) by Dynamic Differential Scanning Calorimetry (DSC):

Dynamic DSC, as defined above.

Initial Glass Transition Temperature (Initial Tg):

As defined above.

Cured Glass Transition Temperature (Cured Tg):

A 5 mm diameter disk was cut out of a cured molded material and the DSC of the molded material was determined from a single temperature sweep from −25 to 200° C. at a 10° C./min ramp rate, as defined above.

Initial Tool Coverage:

During compression molding, a charge of molding compound is placed on the tool (mold) and then pressure and temperature is applied for it to flow, fill the tool and cure. Initial tool coverage is the percentage area that the molding compound covers relative to the final molded part.

Tensile or Young's Modulus:

This property was measured according to ASTM standard D3039 (2014) on an Instron (Model #5967) tensile testing set up using a 647 hydraulic wedge grip with a grip set pressure of 20,000 kPa. The pull speed used was 5 mm/min and strain was recorded using Instron W-00129 video extensometer.

Tensile Strength:

This property was measured according to ASTM standard D3039 (2014) on an Instron (Model #5967, Instron Engineering Corp., an ITW Company, Norwood, Mass.) tensile testing set up using a 647 hydraulic wedge grip with a grip set pressure of 20,000 kPa. The pull speed used was 5 mm/min and strain was recorded using Instron W-00129 video extensometer.

Example 1

Flowability Vs. Particle Size

To demonstrate the effective range of shredded material particle size, the Scrap (A) listed in Table 1, below, was shredded to the indicated average particle size (see Table 2, below) using the indicated shredding device (see Table 2, below), followed by preheating the Scrap (A) and mixing it for 10 minutes with the indicated make-up materials (B) in a stainless steel (SS316L) batch sigma mixer (Sigma Blade, Jaygo Inc., Union, N.J.) having a 15 L capacity, and kept at 25° C. Each formulation had a target fiber content of 50 wt. %. In each Example, the scrap was preheated to 55° C. prior to mixing. In each Example, the weight ratio of Scrap (A) to Make-up material (B) was 83.3:16.7 wt. %.

Following mixing, the several pieces of the indicated materials were compression molded at 26,200 kPa (3800 psi) at a molding temperature of 150° C. for 3 minutes in an attempt to make a 30 cm×30 cm (12"×12") plaque. The shredded Scrap (A) material size, the initial tool coverage, and the results of molding are indicated in Table 2, below.

TABLE 1

| Materials | | | | | |
|---|---|---|---|---|---|
| | EXAMPLE | | | | |
| | 1.1 wt. % | 1.2 wt. % | 1.3 wt. % | 1.4* wt. % | 1.5* wt. % |
| Scrap Formulation (A) | | | | | |
| Epoxy Resin 4 (Solid) | 13.23 | 13.23 | 13.23 | 13.23 | 13.23 |
| Epoxy Resin 2 | 13.90 | 13.90 | 13.90 | 13.90 | 13.90 |
| Epoxy Resin 1 | 7.45 | 7.45 | 7.45 | 7.45 | 7.45 |
| Mold Release Agent 1 | 0.86 | 0.86 | 0.86 | 0.86 | 0.86 |
| Hardener | 3.17 | 3.17 | 3.17 | 3.17 | 3.17 |
| Catalyst 2 | 0.00 | 0.00 | 0.00 | 0.00 | 0.00 |
| Catalyst 1 | 1.38 | 1.38 | 1.38 | 1.38 | 1.38 |
| Carbon Fiber | 60.00 | 60.00 | 60.00 | 60.00 | 60.00 |
| Carbon Fiber Fabric | UD | UD | UD | NCF | NCF |
| Make-up Formulation (B) | | | | | |
| Epoxy Resin 4 (Solid) | 0.00 | 0.00 | 0.00 | 0.00 | 0.00 |
| Epoxy Resin 2 | 0.00 | 0.00 | 0.00 | 0.00 | 0.00 |
| Epoxy Resin 3 | 88.03 | 88.03 | 88.03 | 88.03 | 88.03 |
| Mold Release Agent 1 | 3.52 | 3.52 | 3.52 | 3.52 | 3.52 |
| Hardener | 5.81 | 5.81 | 5.81 | 5.81 | 5.81 |
| Catalyst 2 | 2.64 | 2.64 | 2.64 | 2.64 | 2.64 |
| Catalyst 1 | 0.00 | 0.00 | 0.00 | 0.00 | 0.00 |
| Shredder | Cross cut paper shredder[1] | Reel slit cutter | Reel slit cutter | =Bi-cutter shredder[2] | Reel slit cutter |

[1]Staples model SPL-TXC24A, Staples office stores;
[2]SRS Systems, Inc., Cicero, NY;
*Denotes Comparative Example.

TABLE 2

Mechanical Properties and Ease Of Moldability

| | EXAMPLE | | | | |
|---|---|---|---|---|---|
| | 1.1 | 1.2 | 1.3 | 1.4* | 1.5* |
| Shredded material size (L × W) | 7.5 mm × 11 mm | 22 mm × 51 mm | 22 mm × 76.2 mm | 2.5 mm × 2.5 mm | 63.5 mm × 63.5 mm |
| Initial tool coverage | 25%-100% | 50%-100% | 100% | 50% | 75% |
| Molding Comment | Formed into a rectangular brick (101.6 mm × 101.6 mm, 203.2 mm × 203.2 mm, 254 mm × 254 mm) | Formed into a rectangular brick (203.2 mm × 203.2 mm, 254 mm × 254 mm) | Formed into a rectangular brick (304.8 mm × 304.8 mm) | The mixed mass was very dry and could not be formed into a brick | Difficulty in mixing. High torque consumed during process |
| Molding Result | Good Part with no defect | Good Part with no defect | Good Part with no defect | Incomplete Non-uniform part | Incomplete Non-uniform part |
| Cured Tg | 142-150° C. | 142-150° C. | 142-150° C. | 142-150° C. | 142-150° C. |
| Tensile Modulus | 25.7 Gpa | 23.6 Gpa | 26.4 Gpa | Not available | Not available |
| Tensile Strength | 110 Mpa | 93 MPa | 114 MPa | Not available | Not available |

*Denotes Comparative Example.

As shown in Table 2, above, molded plaques of recycled scrap material were obtained when the materials were shredded to the desired size of the present invention, as in Examples 1.1, 1.2 and 1.3. When materials were shredded too small, as in Example 1.4 or too large, as in Example 1.5, molding failed.

Example 2

Scrap Resin Tg and Shredding in Molding

To demonstrate the influence of initial Tg of the scrap on the processability and the resulting molding properties, the Scrap (A) listed in Table 3, below, was shredded using an industrial shredder combo machine (model IS-20 combo shredder, Industrial Shredders Inc., Olmsted Falls, Ohio) to the average particle size indicated in Table 4, below, followed by preheating the Scrap (A) and mixing it for 10 minutes with the indicated make-up materials (B) in a stainless steel (SS316L) batch sigma mixer (Sigma Blade, Jaygo Inc., Union, N.J.) having a 15 L capacity, and kept at 25° C. Each formulation had a target fiber content of 50 wt. %. In each Example, the scrap was preheated to 55° C. prior to mixing. In each Example, the weight ratio of Scrap (A) to Make-up material (B) was 83.3:16.7 wt. %.

Following mixing, several pieces of each of the indicated materials were compression molded at 26,200 kPa (3800 psi) at a molding temperature of 150° C. for 3 minutes in an attempt to make a 30 cm×30 cm (12"×12") plaque. The shredded Scrap (A) material size, the initial tool coverage, and the results of molding are indicated in Table 4, below.

TABLE 3

Materials

| | EXAMPLE | | | |
|---|---|---|---|---|
| | 2.1 wt. % | 2.2* wt. % | 2.3 wt. % | 2.4* wt. % |
| Scrap Formulation (A) | | | | |
| Epoxy Resin 4 (Solid) | 13.23 | 13.23 | 13.23 | 13.23 |
| Epoxy Resin 2 | 13.90 | 13.90 | 13.90 | 13.90 |
| Epoxy Resin 1 | 7.45 | 7.45 | 7.45 | 7.45 |
| Mold Release Agent 1 | 0.86 | 0.86 | 0.86 | 0.86 |
| Hardener | 3.17 | 3.17 | 3.17 | 3.17 |
| Catalyst 2 | 0.00 | 0.00 | 0.00 | 0.00 |
| Catalyst 1 | 1.38 | 1.38 | 1.38 | 1.38 |
| Carbon Fiber | 60.00 | 60.00 | 60.00 | 60.00 |
| Carbon Fiber Fabric | UD | NCF | Braid | NCF |
| Scrap Initial Tg (Dynamic DSC) | 18° C. | 5° C. | 58° C. | 85° C. |
| Make-up Formulation (B) | | | | |
| Epoxy Resin 4 (Solid) | 0.00 | 0.00 | 0.00 | 0.00 |
| Epoxy Resin 2 | 0.00 | 0.00 | 0.00 | 0.00 |
| Epoxy Resin 3 | 88.03 | 88.03 | 88.03 | 88.03 |
| Mold Release Agent 1 | 3.52 | 3.52 | 3.52 | 3.52 |
| Hardener | 5.81 | 5.81 | 5.81 | 5.81 |
| Catalyst 2 | 2.64 | 2.64 | 2.64 | 2.64 |
| Catalyst 1 | 0.00 | 0.00 | 0.00 | 0.00 |

*Denotes Comparative Example.

TABLE 4

Mechanical Properties and Ease Of Moldability

| | EXAMPLE | | | |
|---|---|---|---|---|
| | 2.1 | 2.2* | 2.3 | 2.4* |
| Shredded material size (L × W) | 7.5 mm × 11 mm | n/a | 7.5 mm × 11 mm | 7.5 mm × 11 mm |
| Initial tool coverage | 25%-100% | n/a | 25-100% | 50% |

TABLE 4-continued

Mechanical Properties and Ease Of Moldability

| | EXAMPLE | | | |
|---|---|---|---|---|
| | 2.1 | 2.2* | 2.3 | 2.4* |
| Molding Comment | 30 cm × 30 cm plaque | n/a | 30 cm × 30 cm plaque | 30 cm × 30 cm plaque |
| Molding Result | Good Part with no defect | Not molded | Good Part with no defect | Good Part with no defect |
| Cured Tg | 142-150° C. | n/a | 142-150° C. | 142-150° C. |
| Tensile Modulus | 25-30 Gpa | n/a | 25-30 Gpa | 25-30 Gpa |
| Tensile Strength | 110 Mpa | n/a | 108 MPa | 38 MPa |

*Denotes Comparative Example.

As shown in Table 4, above, molded plaques of recycled scrap material were obtained when the materials were shredded to the desired size of the present invention, as in Examples 2.1, 2.3 and 2.4. However, when the scrap epoxy resin was too soft as in Example 2.2, the shredding failed; it is still possible to shred the Scrap of Example 2.2 when that Scrap is refrigerated and shredded. In Example 2.4, the epoxy resin was too hard and generated a high mixing torque in the batch sigma mixer; further, the hard epoxy resin and the make-up resin could not be flowed together and mixed well and the resulting molded part had poor tensile strength.

Example 3

Scrap Resin and Virgin Fiber in Molding

To demonstrate the feasibility of incorporating virgin carbon fiber into the final mix, the Scrap (A) listed in Table 5, below, was shredded using a cross cut paper shredder machine to an average size of 7.5×11 mm. In Examples 3.1, 3.2 and 3.4, this was followed by preheating the Scrap (A) to 55° C. and mixing it for 10 minutes with the indicated make-up materials (B) and (C) in the weight ratio indicated in Table 5, below, in a stainless steel (SS316L) batch sigma mixer (Sigma Blade, Jaygo Inc., Union, N.J.) having a 15 L capacity, and kept at 25° C. In Example 3.4, the Scrap (A) and indicated make-up materials (B) and (C) were fed into a twin screw extruder set at a temperature of 100° C. Each formulation had a target fiber content of 50 wt. %.

Following mixing, several pieces of each of the indicated materials were compression molded at 26,200 kPa (3800 psi) at a molding temperature of 150° C. for 3 minutes in an attempt to make a 30 cm×30 cm (12"×12") plaque. The shredded Scrap (A) material size, the initial tool coverage and the results of molding are indicated in Table 6, below.

TABLE 5

Materials

| | EXAMPLE | | | |
|---|---|---|---|---|
| | 3.1 wt. % | 3.2 wt. % | 3.3 wt. % | 3.4 wt. % |
| Scrap Formulation (A) | | | | |
| Epoxy Resin 4 (Solid) | 13.23 | 27.70 | 13.23 | 13.23 |
| Epoxy Resin 2 | 13.90 | 13.80 | 13.90 | 13.90 |
| Epoxy Resin 1 | 7.45 | 4.60 | 7.45 | 7.45 |
| Mold Release Agent 1 | 0.86 | 0.00 | 0.86 | 0.86 |
| Hardener | 3.17 | 2.50 | 3.17 | 3.17 |
| Catalyst 2 | 0.00 | 0.00 | 0.00 | 0.00 |
| Catalyst 1 | 1.38 | 1.40 | 1.38 | 1.38 |
| Carbon Fiber | 60.00 | 50.00 | 60.00 | 60.00 |
| Carbon Fiber Fabric | NCF | UD | NCF | NCF |
| Make-up Formulation (B) | | | | |
| Epoxy Resin 4 (Solid) | 0.00 | 21.50 | 0.00 | 0.00 |
| Epoxy Resin 2 | 0.00 | 21.50 | 0.00 | 0.00 |
| Epoxy Resin 3 | 88.03 | 0.00 | 88.03 | 88.03 |
| Mold Release Agent 1 | 3.52 | 1.70 | 3.52 | 3.52 |
| Hardener | 5.81 | 3.60 | 5.81 | 5.81 |
| Catalyst 2 | 2.64 | 0.00 | 2.64 | 2.64 |
| Catalyst 1 | 0.00 | 1.70 | 0.00 | 0.00 |
| Carbon Fiber (Virgin) | 0.00 | 50.00 | 0 | 0 |
| (C) Chopped Carbon fiber (2.54 cm) | 0.00 | 0.00 | 100.00 | 100.00 |
| Wt. Ratio (A):(B):(C) | 83.3%, 16.7%, 0% | 50%, 50%, 0% | 50%, 30%, 20% | 50%, 30%, 20% |

TABLE 6

Mechanical Properties and Ease Of Moldability

| | EXAMPLE | | | |
|---|---|---|---|---|
| | 3.1 | 3.2 | 3.3 | 3.4 |
| Initial tool coverage | 25-100% | 25-100% | 25-100% | 25-100% |
| Molding Comment | 30 cm × 30 cm plaque | 30 cm × 30 cm plaque | 30 cm × 30 cm plaque | 30 cm × 30 cm plaque |
| Molding Result | Good Part with no defect | Good Part with no defect | Good Part with no defect | Good Part with no defect |
| Cured Tg | 142-150° C. | 142-150° C. | 142-150° C. | 142-150° C. |
| Tensile | 25.7 Gpa | 25.1 Gpa | 23.9 Gpa | 25-30 Gpa |

TABLE 6-continued

Mechanical Properties and Ease Of Moldability

| | EXAMPLE | | | |
|---|---|---|---|---|
| | 3.1 | 3.2 | 3.3 | 3.4 |
| Modulus | | | | |
| Tensile Strength | 110 Mpa | 112 Mpa | 94 MPa | 80-100 MPa |

As shown in Table 6, above, molded plaques of recycled scrap material were obtained when the materials were shredded to the desired size of the present invention, as in all of Examples 3.1, 3.2, 3.3 and 3.4. Accordingly, when make-up fiber and some make up resin are added and the fiber content of the final product is within the range of the present invention, a good molded product results as long as materials can be flowed together and mixed well. An extruder can be used in place of a batch mixer, as shown in Example 3.4; however, the tensile strength of such recycled products is not preferred.

Example 4

Effect of Mixer Type

To demonstrate that different types of mixers yields comparable part performance, the Scrap (A) listed in Table 7, below, was shredded using a cross cut paper shredder (Staples model SPL-TXC24A) to the average particle size of 7.5 mm×11 mm. In Example 4.1, this was followed by preheating the Scrap (A) to 55° C. and mixing it for 10 minutes with the indicated make-up materials (B) in a stainless steel (SS316L) batch sigma mixer (Sigma Blade, Jaygo Inc., Union, N.J.) having a 15 L capacity, and kept at 25° C. In Example 4.2, this was followed by preheating the Scrap (A) to 55° C. and mixing it for 10 minutes with the indicated make-up materials (B) in a stainless steel (SS316) batch Henschel mixer (FM-10US mixer, Henschel America, Inc., Green Bay, Wis.) having a 9 L capacity, and kept at 25° C. In Example 4.3, the Scrap (A) and indicated make-up materials (B) were fed into a twin screw extruder set at a temperature of 100° C. In each Example, the weight ratio of Scrap (A) to Make-up material (B) was 83.3:16.7 wt. %. Each formulation had a target fiber content of 50 wt. %.

Following mixing, the indicated materials were compression molded at 26,200 kPa (3800 psi) at a molding temperature of 150° C. for 3 minutes in an attempt to make a 30 cm×30 cm (12"×12") plaque. The initial tool coverage and the results of molding are indicated in Table 8, below.

TABLE 7

Materials

| | EXAMPLE | | |
|---|---|---|---|
| | 4.1 wt. % | 4.2 wt. % | 4.3 wt. % |
| Scrap Formulation (A) | | | |
| Epoxy Resin 4 (Solid) | 13.23 | 13.23 | 13.23 |
| Epoxy Resin 2 | 13.90 | 13.90 | 13.90 |
| Epoxy Resin 1 | 7.45 | 7.45 | 7.45 |
| Mold Release Agent 1 | 0.86 | 0.86 | 0.86 |
| Hardener | 3.17 | 3.17 | 3.17 |
| Catalyst 2 | 0.00 | 0.00 | 0.00 |
| Catalyst 1 | 1.38 | 1.38 | 1.38 |

TABLE 7-continued

Materials

| | EXAMPLE | | |
|---|---|---|---|
| | 4.1 wt. % | 4.2 wt. % | 4.3 wt. % |
| Carbon Fiber | 60.00 | 60.00 | 60.00 |
| Carbon Fiber Fabric | UD | UD | NCF |
| Make-up Formulation (B) | | | |
| Epoxy Resin 4 (Solid) | 0.00 | 0.00 | 0.00 |
| Epoxy Resin 2 | 0.00 | 0.00 | 0.00 |
| Epoxy Resin 3 | 88.03 | 88.03 | 88.03 |
| Mold Release Agent 1 | 3.52 | 3.52 | 3.52 |
| Hardener | 5.81 | 5.81 | 5.81 |
| Catalyst 2 | 2.64 | 2.64 | 2.64 |
| Catalyst 1 | 0.00 | 0.00 | 0.00 |
| Carbon Fiber (Virgin) | 0.00 | 0.00 | 0.00 |

TABLE 8

Mechanical Properties and Ease Of Moldability

| | EXAMPLE | | |
|---|---|---|---|
| | 4.1 | 4.2 | 4.3 |
| Initial tool coverage | 25-100% | 25-100% | 25-100% |
| Molding Comment | 30 cm × 30 cm plaque | 30 cm × 30 cm plaque | 30 cm × 30 cm plaque |
| Molding Result | Good Part with no defect | Good Part with no defect | Good Part with no defect |
| Cured Tg | 142-150° C. | 142-150° C. | 142-150° C. |
| Tensile Modulus | 25.7 Gpa | 25.1 Gpa | 23.5 Gpa |
| Tensile Strength | 110 Mpa | 112 Mpa | 93.5 Mpa |

As shown in Table 8, above, both a Sigma and a Henschel batch mixer can be used to make a recycled part with good mechanical properties. An extruder may also be used.

Example 5

Effect of Make-up Resin Chemistry

To demonstrate that different chemistry yields comparable part performance, the Scrap (A) listed in Table 9, below, was shredded to an average particle size of 15 mm×22 mm using a cross cut paper shredder (Staples model SPL-TXC24A), followed by preheating the Scrap (A) and mixing it for 10 minutes with the indicated make-up materials (B) in a stainless steel (SS316L) batch sigma mixer (Sigma Blade, Jaygo Inc., Union, N.J.) having a 15 L capacity, and kept at 40° C. Each formulation had a target fiber content of 50 wt. %. In each Example, the scrap was preheated to 55° C. prior to mixing. In each Example, the weight ratio of Scrap (A) to Make-up material (B) was 83.3:16.7 wt. %.

Following mixing, the indicated materials were compression molded at 26,200 kPa (3800 psi) at a molding temperature of 150° C. for 3 minutes in an attempt to make a 30 cm×30 cm (12"×12") plaque. The initial tool coverage, and the results of molding are indicated in Table 10, below.

TABLE 9

Materials

| | EXAMPLE | | | | |
|---|---|---|---|---|---|
| | 5.1 wt. % | 5.2 wt. % | 5.3 wt. % | 5.4 wt. % | 5.5* wt. % |
| Scrap Formulation (A) | | | | | |
| Epoxy Resin 4 (Solid) | 13.23 | 13.23 | 13.23 | 13.23 | 13.23 |
| Epoxy Resin 2 | 13.90 | 13.90 | 13.90 | 13.90 | 13.90 |
| Epoxy Resin 1 | 7.45 | 7.45 | 7.45 | 7.45 | 7.45 |
| Mold Release Agent 1 | 0.86 | 0.86 | 0.86 | 0.86 | 0.86 |
| Hardener | 3.17 | 3.17 | 3.17 | 3.17 | 3.17 |
| Catalyst 2 | 0.00 | 0.00 | 0.00 | 0.00 | 0.00 |
| Catalyst 1 | 1.38 | 1.38 | 1.38 | 1.38 | 1.38 |
| Carbon Fiber | 60.00 | 60.00 | 60.00 | 60.00 | 60.00 |
| Carbon Fiber Fabric | NCF | NCF | NCF | NCF | NCF |
| Make-up Formulation (B) | | | | | |
| Epoxy Resin 4 (Solid) | 0.00 | 0.00 | 0.00 | 13.23 | 42.90 |
| Epoxy Resin 2 | 0.00 | 25.20 | 0.00 | 13.90 | 42.90 |
| Epoxy Resin 3 | 88.03 | 58.80 | 76.00 | 7.45 | 0.00 |
| Mold Release Agent 1 | 3.52 | 5.90 | 3.00 | 3.00 | 3.40 |
| Hardener | 5.81 | 6.70 | 0.00 | 3.17 | 7.30 |
| Catalyst 2 | 2.64 | 0.00 | 0.00 | 0.00 | 0.00 |
| Catalyst 1 | 0.00 | 3.40 | 0.00 | 1.38 | 3.40 |
| Hardener 2 | 0.00 | 0.00 | 19.00 | 0.00 | 0.00 |
| Catalyst 3 | 0.00 | 0.00 | 2.00 | 0.00 | 0.00 |
| Make-up Resin Tg During Mixing (° C.) | −10.0 | −5.0 | −13.0 | 12.0 | 26.0 |
| Make-up Resin Viscosity[1] (Pa · s @ 40° C.) | 3.00 | 4.00 | 1.50 | 5.50 | 40.00 |

*Denotes Comparative Example;
[1]Oscillatory shear rate sweep from 0.1-100 rad/sec at 25% strain in a 25 mm parallel plate geometry (Rheometer).

TABLE 2

Mechanical Properties and Ease Of Moldability

| | EXAMPLE | | | | |
|---|---|---|---|---|---|
| | 5.1 | 5.2 | 5.3 | 5.4 | 5.5* |
| Initial tool coverage | 50% | 50% | 50% | 50% | 50% |
| Molding Comment | Formed into a rectangular brick | Formed into a rectangular brick | Formed into a rectangular brick | Formed into a rectangular brick | The mixed mass was non-uniform with resin rich regions |
| Molding Result | Good Part with no defect | Good Part with no defect | Good Part with no defect | Good Part with no defect | Incomplete Non-uniform part |
| Cured Tg | 142-150° C. | 146-155° C. | 148-160° C. | 146-152° C. | 130-152° C. |

*Denotes Comparative Example.

As shown in Table 10, above, good molded plaques of recycled scrap material were obtained when the make-up resin (B), including any hardener and catalyst had a Tg of less than about 20° C., as in Examples 5.1, 5.2, 5.3 and 5.4. When the make-up resin (B) was too hard, complete mixing was not possible and, as in Example 5.5, molding failed.

We claim:

1. A method for reclaiming scrap containing from 25 to 60 wt. %, based on the total weight of the scrap, of an at least partially uncured to fully uncured two component thermosetting resin mixture of (i) one or more thermosetting resins, and (ii) a latent hardener and/or catalyst, and one or more heat resistant fibers, the method comprising shredding the scrap, then preheating the scrap to from 40 to 100° C, and then batch mixing the preheated shredded scrap to provide a fluid material charge and then compression molding the fluid material charge to make a cured composite material.

2. The method as claimed in claim 1, wherein the (i) one or more thermosetting resins comprises epoxy resin, vinyl ester resin, or polyester.

3. The method as claimed in claim 1, wherein in the method, the scrap contains the one or more heat resistant fibers impregnated or infused with the one or more at least partially uncured to fully uncured two component thermosetting resin mixture, and the method comprises shredding the scrap material into pieces having an average size of from 3 to 50 mm, mixing the shredded scrap material to form a fluid charge by (a) extruding the shredded material at a temperature A which is at least 10° C. above the glass transition temperature Tg as determined by Dynamic differential scanning calorimetry of the (i) thermosetting resin in the uncured two component thermosetting resin mixture that has Temperature B, the highest Tg as determined by Dynamic differential scanning calorimetry of the thermosetting resins in the scrap material, or by (b) preheating the shredded scrap material to at least 5° C. above the Temperature B, followed by batch mixing the shredded material at least the Temperature B; followed by compression molding the fluid charge to make a cured composite, further wherein, in (a) or (b), if needed, the mixing includes combining the shredded scrap material with a sufficient amount of one or more uncured two component thermosetting resin mixture which has a Tg of below Temperature B to provide a fluid material charge having a total of from 25 to 60 wt. %, based on the total weight of the scrap, of the uncured two component thermosetting resin mixture.

4. The method as claimed in claim 1, wherein the mixing includes combining the shredded scrap material with any of (i) a thermosetting resin having a Tg above 30° C., a liquid thermosetting resin, or mixtures thereof; (ii) virgin chopped fiber; one or more catalysts, hardeners, tougheners or mold release agents; and (iii) molding materials, wherein in (ii) or (iii), wherein the resulting shredded scrap material contains from 25 to 60 wt. % of total uncured thermosetting resin, based on the total weight of the resulting shredded scrap material.

5. The method as claimed in claim 1, further comprising shaping the fluid charge into a desired shape by using nip rolls, or a laminator, or by casting into different molds, prior to compression molding.

6. The method as claimed in claim 1, wherein the uncured two component thermosetting resin mixture comprises (i) one or more liquid epoxy resins.

7. The method as claimed in claim 1, wherein the uncured two component thermosetting resin mixture comprises (i) one or more epoxy resins that has a viscosity, as determined with Rheometer at oscillatory shear rate sweep from 0.1-100 rad/sec at 25% strain in a 25 mm parallel plate geometry, of from 500 to 300,000 mPa·s at room temperature.

8. The method as claimed in claim 1, wherein the one or more heat resistant fibers is chosen from carbon fiber, glass fiber, ceramic fiber, acrylonitrile fibers, aramid fibers, or their admixtures.

9. The method as claimed in claim 1, wherein the one or more latent hardener and/or catalyst, is a solid catalyst chosen from a urea containing catalyst, a urea resin containing catalyst, a dicyandiamide and an oxazolidine group containing catalyst.

* * * * *